J. K. BUE.
FLY TRAP.
APPLICATION FILED MAY 14, 1912.
1,087,869.
Patented Feb. 17, 1914.
2 SHEETS—SHEET 1.
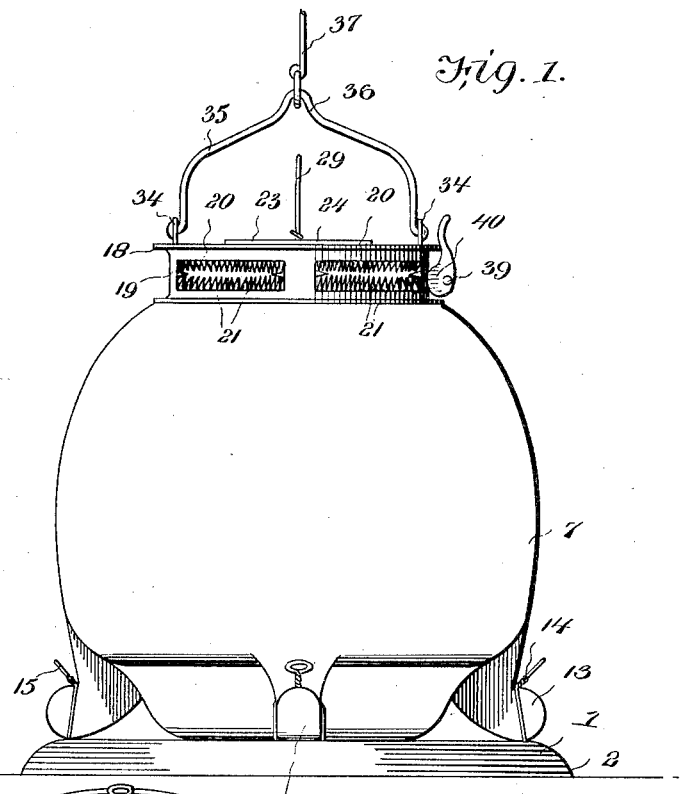
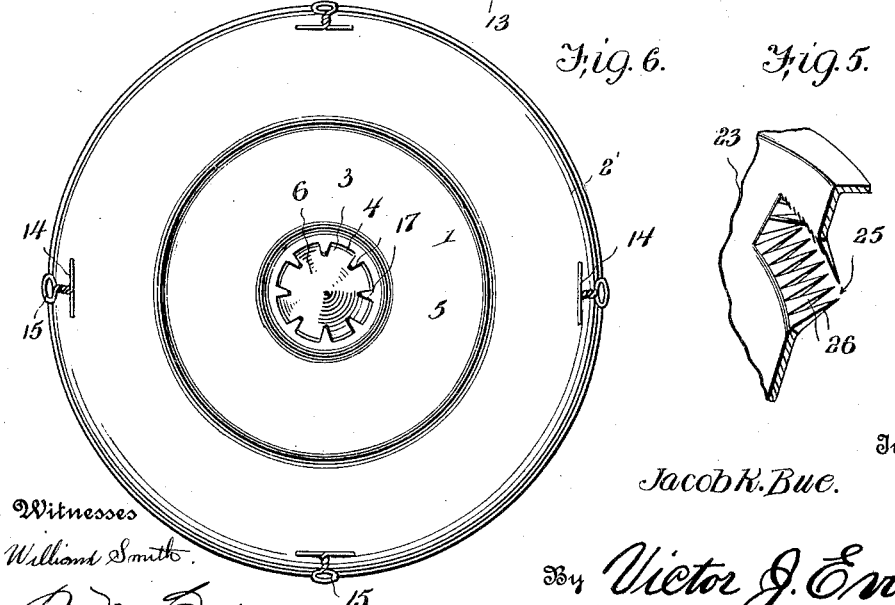
Witnesses
William Smith
R. M. Smith
Inventor
Jacob K. Bue.
By Victor J. Evans
Attorney

J. K. BUE.
FLY TRAP.
APPLICATION FILED MAY 14, 1912.

1,087,869.

Patented Feb. 17, 1914.

2 SHEETS—SHEET 2.

Inventor
Jacob K. Bue.

Witnesses
William Smith.
R. M. Smith.

By Victor J. Evans
Attorney

UNITED STATES PATENT OFFICE.

JACOB K. BUE, OF HAVRE, MONTANA.

FLY-TRAP.

1,087,869.  Specification of Letters Patent.  Patented Feb. 17, 1914.

Application filed May 14, 1912. Serial No. 697,310.

*To all whom it may concern:*

Be it known that I, JACOB K. BUE, a citizen of the United States, residing at Havre, in the county of Chouteau and State of Montana, have invented new and useful Improvements in Fly-Traps, of which the following is a specification.

This invention relates to fly traps or catchers, the object in view being to provide a trap of large capacity which will entrap flies and retain the same, after they are poisoned, the trap as a whole embodying a number of features so combined and arranged with respect to each other, that the dead flies are concealed from those attempting to enter the trap.

A further object of the invention is to provide a trap of the class referred to, made up of separable parts which may be readily disconnected to allow the trap to be thoroughly cleansed and kept in a sanitary condition.

With the above and other objects in view, the invention consists in the construction, combination and arrangement of parts, as will be hereinafter more fully described, illustrated in the accompanying drawings, and pointed out in the claims hereunto appended.

Figure 3:
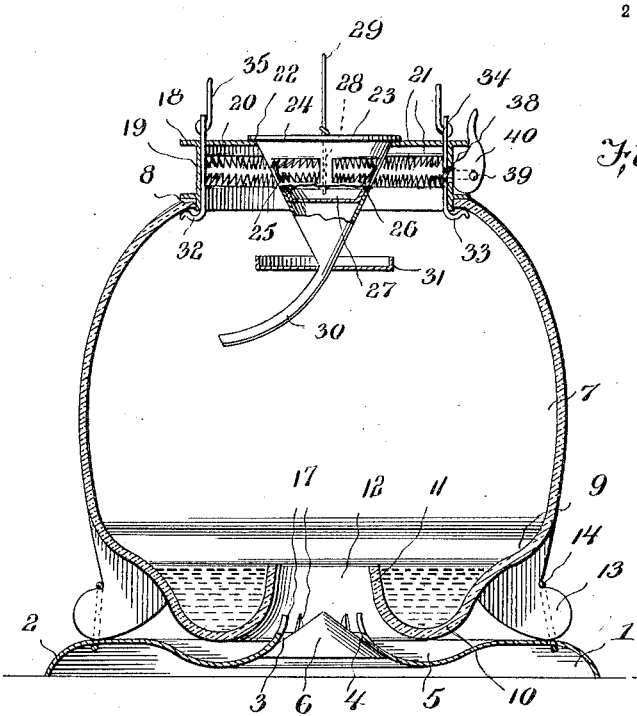
Figure 2:
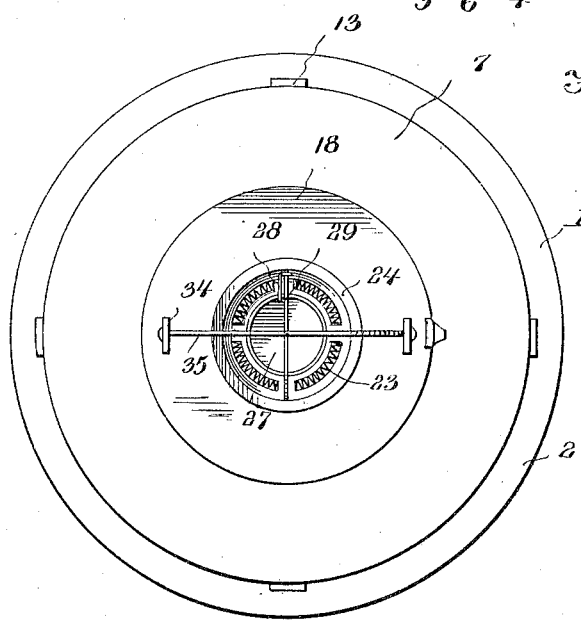
Figure 4:
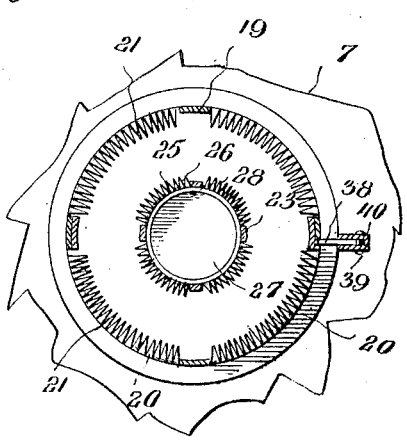

In the drawings: Figure 1 is a side elevation of a fly trap, embodying the present invention. Fig. 2 is a plan view thereof. Fig. 3 is a vertical diametrical section through the same. Fig. 4 is a horizontal section through the cover. Fig. 5 is a fragmentary view of the central cone. Fig. 6 is a perspective view of the base.

The trap contemplated in this invention comprises a base 1, consisting of a circular plate of sheet metal, having the outer edge thereof turned downward to form a supporting rim 2, and the inner edge adjacent to the central opening 3 is turned upward to form an upstanding conical flange 4, between which and the outer edge of the plate there remains an annular depression 5, along which the flies travel in gaining entrance to the bottom of the trap.

Within the central opening 3, there is arranged an upstanding cone 6 secured to the bottom plate 1 which prevents the flies from escaping through the bottom of the base 1.

Supported upon the base 1 is a substantially spherical globe 7 of glass, having a large opening 8 in the top thereof, the bottom of the globe being inwardly offset, at 9, to form a ledge, upon which the flies may rest while consuming the poisoned water, which is contained in an annular gutter 10 formed as an integral part of the glass globe. The inner wall of this trough is formed by an upstanding neck 11, also constituting an integral portion of the globe and terminating in a large central opening 12, which is adapted to allow the flies to pass upwardly into the interior of the globe 7. The globe 7 is further provided, at suitable intervals around the bottom thereof, with supporting feet 13 which rest upon the base and are adapted to be secured thereto by means of pivoted loops or fasteners 14, the same being pivotally connected to the base, at 15, and provided at their upper ends with finger grips 15 to adapt the same to be readily moved into and out of engagement with the feet 13. This enables the base and globe to be separated for the purpose of cleansing both of said parts of the trap.

The base 1 is further provided around the margin of the opening 3 with upwardly extending sharp-pointed prongs 17, which do not interfere with the entrance of the flies, but are placed there to interfere with any attempts on the part of the flies to get out of the trap, the same way they entered it.

Upon the open top of the globe 7 is placed a cover, preferably formed out of sheet metal, and comprising an annular top 18, from which extends downwardly a circumferential flange 19 forming the continuous cylindrical side of the cover. The side of the cover is provided, at a number of points, with entrance openings 20 bounded on all sides by sharp inwardly extending and converging prongs 21, adapted to permit the flies to pass between them, in entering the trap, but which will interfere with their exit. Within the central opening 22 in the top 18, there is removably fitted a funnel 23, provided at its top with a flange 24 which rests on the top 18, so as to support the funnel. At intervals around the side of the funnel, the latter is provided with entrance openings 25 bounded on all sides by outwardly projecting sharp prongs 26, said openings being arranged substantially in the same way and for the same purpose as the openings 20 above referred to.

27 designates a bait shelf, removably fitted in the central portion of the funnel and below the openings 25, said shelf being adapted to receive sugar or other bait to attract the flies. This shelf 27 is preferably connected by means of a link 28 to the bail-shaped handle 29 of the funnel, which handle enables the funnel to be lifted out of the top and replaced.

Extending downwardly from the bottom end of the funnel is a laterally curved or deflected water inlet pipe 30 which terminates over the annular gutter 10, so as to enable water to be poured through the funnel into said gutter.

Extending around the base of the funnel is a bait cup 31, in which meat or any other material is adapted to be placed to attract the flies.

The cover 18 is provided at diametrically opposite points with catches 32 and 33 adapted to engage under the top lip or margin of the globe 7 to hold the cover in place thereon. These catches extend upward through the top of the cover to form ears 34, to which the extremities of a bail-shaped support or handle 35 are connected. This handle is provided centrally with an offset 36, adapted to have a supporting cord or chain 37 connected therewith for supporting the trap as a whole from the ceiling.

One of the catches 33 is provided with an outwardly extending arm 38 which passes through an opening in the side wall or flange 19 of the cover, and has pivotally mounted thereon, at 39, a cam 40, by the operation of which the lower portion of the catch 33 may be moved inward or outward, so as to throw the same out of or into engagement with the inturned top margin of the globe 7, said cam working against the outer face of the flange 19. This provides for readily removing the cover, when it is desired to clean the same or obtain access to the interior of the globe.

It will now be understood that the flies may enter at three different places, namely through the bottom of the globe, through the top of the cover, and through the sides of the cover. They are further attracted inward and downward by the material in the bait cup 31, and after passing downward into the globe, or obtaining access thereto through the bottom of the globe or the top thereof, they partake of the poisoned liquid in the annular gutter 10. The bottom of the globe, directly over the base 1, is coated with black paint, or other suitable opaque material, so that when the flies move inwardly along the top of the base 1, they are attracted by the light transmitted downward through the opening 12 in the upturned inlet neck at the bottom of the globe.

What is claimed is:

1. A fly trap, comprising a base, a glass globe detachably supported thereon, a cover removably fitted on the top of the globe and provided with a central opening, an inverted cone removably fitted in said opening, and a laterally deflected water inlet pipe connected to the bottom of said cone and arranged to discharge to one side of said central opening.

2. A fly trap, comprising a base, a glass globe detachably supported thereon, a cover removably fitted upon the top of the globe and provided with fly entrances bounded by pointed barbs, and means for detachably securing the cover to the globe, embodying a catch pivotally mounted on the cover and a cam having a linked connection with said catch for operating the latter.

In testimony whereof I affix my signature in presence of two witnesses.

JACOB K. BUE.

Witnesses:
ADOLPH L. GESCHE,
W. B. PYPER.